United States Patent
Burdo et al.

(10) Patent No.: US 9,130,394 B2
(45) Date of Patent: Sep. 8, 2015

(54) WIRELESS POWER FOR CHARGING DEVICES

(75) Inventors: Rinat Burdo, La Jolla, CA (US); Miles A. Kirby, San Diego, CA (US); Ernest T. Ozaki, Poway, CA (US); Virginia Walker Keating, San Diego, CA (US); James I. Jaffee, Solana Beach, CA (US); Nigel P. Cook, El Cajon, CA (US); Harry M. Hunsicker, Poway, CA (US); Michael J. Mangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1317 days.

(21) Appl. No.: 12/618,555

(22) Filed: Nov. 13, 2009

(65) Prior Publication Data

US 2010/0194206 A1 Aug. 5, 2010

Related U.S. Application Data

(60) Provisional application No. 61/150,302, filed on Feb. 5, 2009, provisional application No. 61/150,254, filed on Feb. 5, 2009, provisional application No. 61/229,218, filed on Jul. 28, 2009, provisional application No. 61/229,664, filed on Jul. 29, 2009, provisional application No. 61/235,660, filed on Aug. 20, 2009.

(51) Int. Cl.
*H02J 7/02* (2006.01)
*G06F 1/26* (2006.01)
*H02J 17/00* (2006.01)
(Continued)

(52) U.S. Cl.
CPC ............. *H02J 7/025* (2013.01); *G06F 1/266* (2013.01); *H02J 7/0054* (2013.01); *H02J 17/00* (2013.01); *H02J 2009/007* (2013.01)

(58) Field of Classification Search
CPC ........................................... H02J 17/00
USPC ........................................... 307/104; 320/108
See application file for complete search history.

(56) References Cited

U.S. PATENT DOCUMENTS

| 7,447,922 B1 | 11/2008 | Asbury et al. |
| 2003/0178967 A1 | 9/2003 | Khatri |

(Continued)

FOREIGN PATENT DOCUMENTS

| CN | 101228678 A | 7/2008 |
| CN | 101287343 A | 10/2008 |

(Continued)

OTHER PUBLICATIONS

International Search Report and Written Opinion—PCT/US2010/023374, International Search Authority—European Patent Office—Mar. 25, 2011.

*Primary Examiner* — Fritz M Fleming
(74) *Attorney, Agent, or Firm* — Knobbe Martens Olson & Bear LLP

(57) ABSTRACT

Exemplary embodiments are directed to wireless power. A host device peripheral may comprise a wireless power charging apparatus, which may include transmit circuitry and at least one antenna coupled to the transmit circuitry. The at least one antenna may be configured to wirelessly transmit power within an associated near-field region. Additionally, the host device peripheral may be configured to couple to a host device.

60 Claims, 17 Drawing Sheets

(51) Int. Cl.
   *H02J 7/00* (2006.01)
   *H02J 9/00* (2006.01)

(56) References Cited

U.S. PATENT DOCUMENTS

| | | | |
|---|---|---|---|
| 2004/0130425 A1* | 7/2004 | Dayan et al. | 336/200 |
| 2005/0151511 A1* | 7/2005 | Chary | 320/127 |
| 2005/0212770 A1 | 9/2005 | Lin et al. | |
| 2006/0143317 A1 | 6/2006 | Shie | |
| 2006/0158152 A1 | 7/2006 | Taniguchi et al. | |
| 2007/0182367 A1* | 8/2007 | Partovi | 320/108 |
| 2007/0191075 A1 | 8/2007 | Greene et al. | |
| 2007/0236975 A1 | 10/2007 | Lippojoki et al. | |
| 2007/0279002 A1 | 12/2007 | Partovi | |
| 2008/0054638 A1 | 3/2008 | Greene et al. | |
| 2008/0061733 A1* | 3/2008 | Toya | 320/108 |
| 2008/0067874 A1 | 3/2008 | Tseng | |
| 2008/0197804 A1 | 8/2008 | Onishi et al. | |
| 2008/0211320 A1 | 9/2008 | Cook et al. | |
| 2008/0251338 A1 | 10/2008 | Golden et al. | |
| 2008/0258679 A1 | 10/2008 | Manico et al. | |
| 2008/0272889 A1 | 11/2008 | Symons | |
| 2008/0315826 A1 | 12/2008 | Alberth, Jr. et al. | |
| 2009/0015075 A1 | 1/2009 | Cook et al. | |
| 2009/0072782 A1* | 3/2009 | Randall | 320/107 |
| 2009/0108805 A1* | 4/2009 | Liu et al. | 320/108 |

FOREIGN PATENT DOCUMENTS

| | | |
|---|---|---|
| GB | 2393860 A | 4/2004 |
| GB | 2422517 A | 7/2006 |
| JP | 2001143798 A | 5/2001 |
| JP | 2004350465 A | 12/2004 |
| JP | 2005210843 A | 8/2005 |
| JP | 2007124890 A | 5/2007 |
| JP | 2007166763 A | 6/2007 |
| JP | 2008048559 A | 2/2008 |
| JP | 2008206296 A | 9/2008 |
| JP | 2009501000 A | 1/2009 |
| JP | 2009504117 A | 1/2009 |
| TW | M331243 U | 4/2008 |
| TW | 200843277 A | 11/2008 |
| TW | 200904015 A | 1/2009 |
| WO | WO0045248 | 8/2000 |
| WO | WO0215320 | 2/2002 |
| WO | WO-2007015599 | 2/2007 |
| WO | WO2007090168 | 8/2007 |
| WO | WO2008044875 | 4/2008 |
| WO | WO-2008050917 A1 | 5/2008 |
| WO | WO2008109691 | 9/2008 |

* cited by examiner

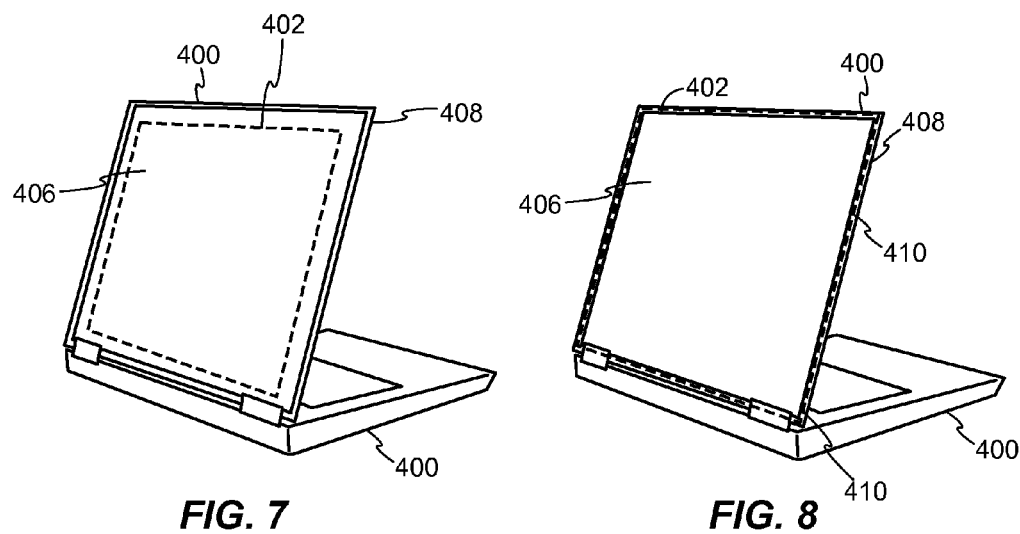
FIG. 7  FIG. 8
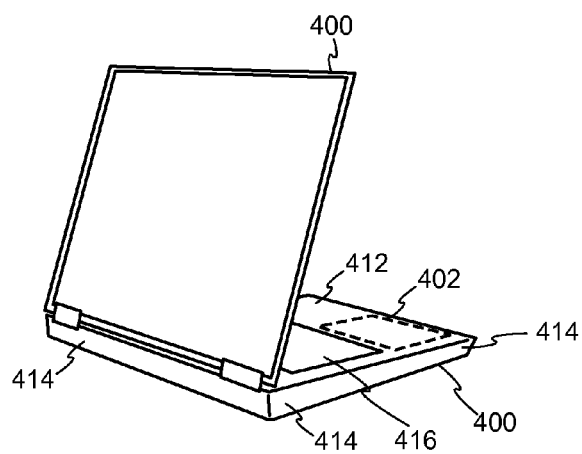
FIG. 9

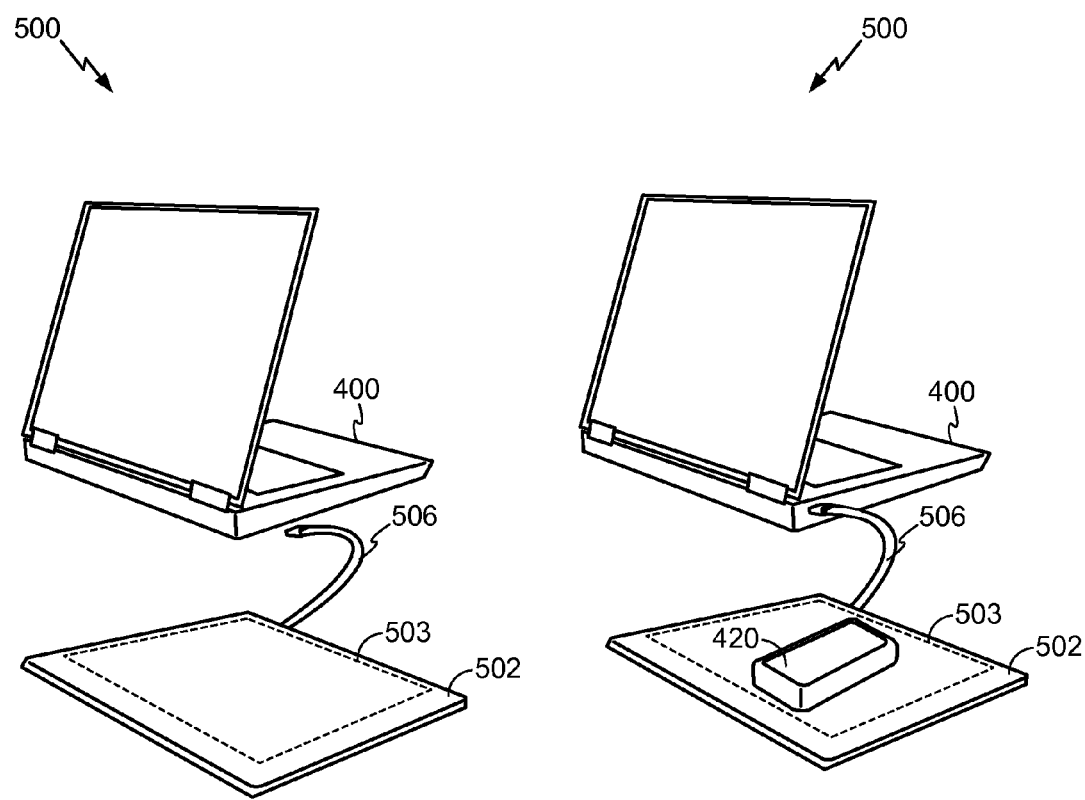

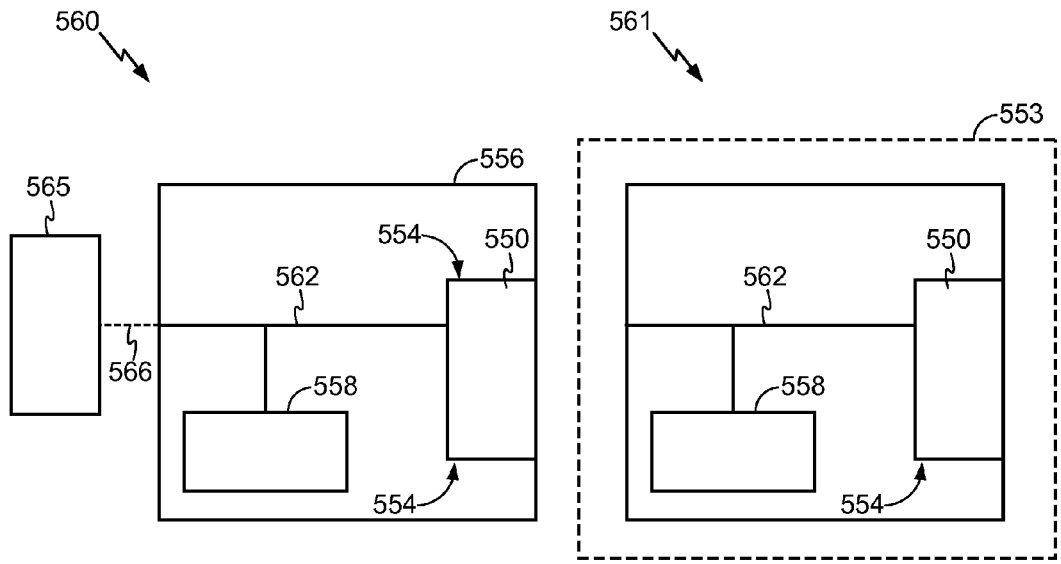
FIG. 20  FIG. 21
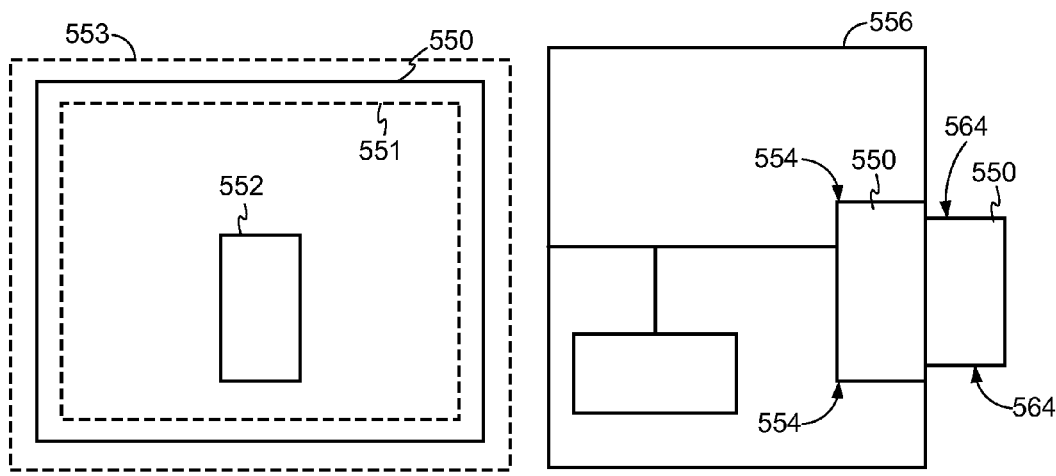
FIG. 22  FIG. 23

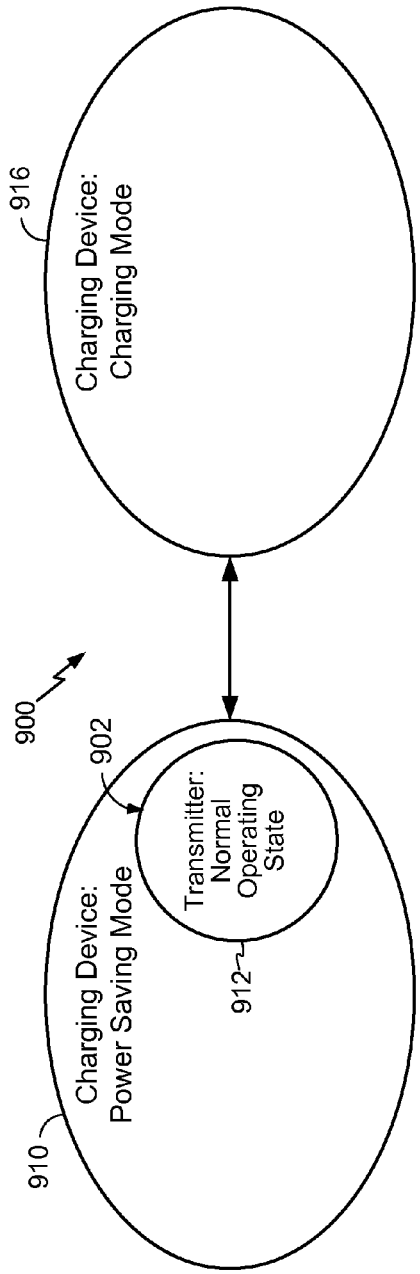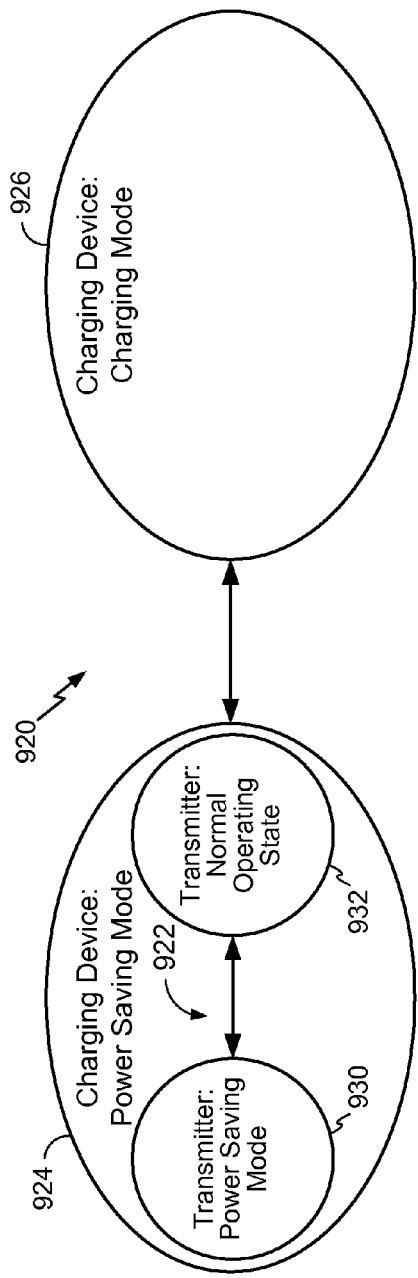

WIRELESS POWER FOR CHARGING DEVICES

CLAIM OF PRIORITY UNDER 35 U.S.C. §119

This application claims priority under 35 U.S.C. §119(e) to:

U.S. Provisional Patent Application 61/150,302 entitled "WIRELESS POWER CHARGER IN A PORTABLE DEVICE" filed on Feb. 5, 2009, the disclosure of which is hereby incorporated by reference in its entirety;

U.S. Provisional Patent Application 61/150,254 entitled "WIRELESS POWER ACCESSORY" filed on Feb. 5, 2009, the disclosure of which is hereby incorporated by reference in its entirety;

U.S. Provisional Patent Application 61/229,218 entitled "POWER MANAGEMENT FOR WIRELESS CHARGING" filed on Jul. 28, 2009, the disclosure of which is hereby incorporated by reference in its entirety;

U.S. Provisional Patent Application 61/229,664 entitled "CHARGING MODULE ACCESSORY" filed on Jul. 29, 2009, the disclosure of which is hereby incorporated by reference in its entirety; and U.S. Provisional Patent Application 61/235,660 entitled "DEPLOYABLE WIRELESS POWER CHARGING SYSTEM" filed on Aug. 20, 2009, the disclosure of which is hereby incorporated by reference in its entirety.

BACKGROUND

1. Field

The present invention relates generally to wireless charging, and more specifically to charging devices including portable charging devices and power management for charging devices.

2. Background

Typically, each battery powered device requires its own charger and power source, which is usually an AC power outlet. This becomes unwieldy when many devices need charging.

Approaches are being developed that use over the air power transmission between a transmitter and the device to be charged. These generally fall into two categories. One is based on the coupling of plane wave radiation (also called far-field radiation) between a transmit antenna and receive antenna on the device to be charged which collects the radiated power and rectifies it for charging the battery. Antennas are generally of resonant length in order to improve the coupling efficiency. This approach suffers from the fact that the power coupling falls off quickly with distance between the antennas. So charging over reasonable distances (e.g., >1-2 m) becomes difficult. Additionally, since the system radiates plane waves, unintentional radiation can interfere with other systems if not properly controlled through filtering.

Other approaches are based on inductive coupling between a transmit antenna embedded, for example, in a "charging" mat or surface and a receive antenna plus rectifying circuit embedded in the host device to be charged. This approach has the disadvantage that the spacing between transmit and receive antennas must be very close (e.g. mms). Though this approach does have the capability to simultaneously charge multiple devices in the same area, this area is typically small, hence the user must locate the devices to a specific area.

A need exists for portable charging devices configured for coupling to an electronic device. Further, there exists a need for electronic charging devices configured for convenient placement of electronic devices to enable for providing wireless power thereof. A need also exists for a charging device configured to detect the presence of an electronic device while in a power saving mode.

BRIEF DESCRIPTION OF THE DRAWINGS

FIG. 7 illustrates a charging device having at least one transmit antenna positioned adjacent a surface thereof, in accordance with an exemplary embodiment of the present invention.

FIG. 8 is another depiction of the charging device of FIG. 7, including at least one transmit antenna positioned adjacent another surface thereof, according to an exemplary embodiment of the present invention.

FIG. 9 is yet another depiction of the charging device of FIGS. 7 and 8, having at least one transmit antenna positioned adjacent yet another surface thereof, according to an exemplary embodiment of the present invention.

FIGS. 16 and 17 illustrate a charging system comprising an electronic device and a charging pad, in accordance with an exemplary embodiment of the present invention.

FIG. 20 illustrates a system including a portable wireless power device positioned within an electronic device, in accordance with an exemplary embodiment of the present invention.

FIG. 21 illustrates a system including a wireless transmit antenna proximate a portable wireless power device positioned within an electronic device, in accordance with an exemplary embodiment of the present invention.

FIG. 22 illustrates a system including a wireless transmit antenna proximate a portable wireless power device, in accordance with an exemplary embodiment of the present invention.

FIG. 23 illustrates a system including a portable wireless power device having a portion deployed from an electronic system, in accordance with an exemplary embodiment of the present invention.

FIG. 30 illustrates a state machine diagram for a charging device, according to an exemplary embodiment of the present invention.

FIG. 31 illustrates another state machine diagram for a charging device, in accordance with an exemplary embodiment of the present invention.

DETAILED DESCRIPTION

The word "exemplary" is used herein to mean "serving as an example, instance, or illustration." Any embodiment described herein as "exemplary" is not necessarily to be construed as preferred or advantageous over other embodiments.

The detailed description set forth below in connection with the appended drawings is intended as a description of exemplary embodiments of the present invention and is not intended to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures and devices are shown in block diagram form in order to avoid obscuring the novelty of the exemplary embodiments presented herein.

The words "wireless power" is used herein to mean any form of energy associated with electric fields, magnetic fields, electromagnetic fields, or otherwise that is transmitted between from a transmitter to a receiver without the use of physical electromagnetic conductors.

Figure 1:
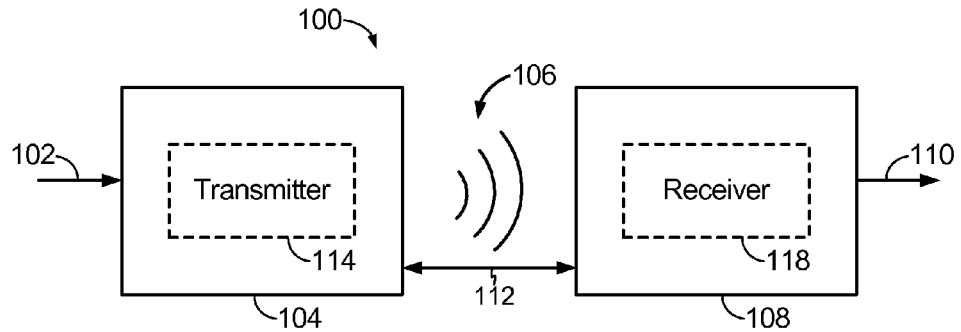
FIG. 1 shows a simplified block diagram of a wireless power transfer system.

FIG. 1 illustrates a wireless transmission or charging system 100, in accordance with various exemplary embodiments of the present invention. Input power 102 is provided to a transmitter 104 for generating a radiated field 106 for providing energy transfer. A receiver 108 couples to the radiated field 106 and generates an output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship and when the resonant frequency of receiver 108 and the resonant frequency of transmitter 104 are very close, transmission losses between the transmitter 104 and the receiver 108 are minimal when the receiver 108 is located in the "near-field" of the radiated field 106.

Transmitter 104 further includes a transmit antenna 114 for providing a means for energy transmission and receiver 108 further includes a receive antenna 118 for providing a means for energy reception. The transmit and receive antennas are sized according to applications and devices to be associated therewith. As stated, an efficient energy transfer occurs by coupling a large portion of the energy in the near-field of the transmitting antenna to a receiving antenna rather than propagating most of the energy in an electromagnetic wave to the far field. When in this near-field a coupling mode may be developed between the transmit antenna 114 and the receive antenna 118. The area around the antennas 114 and 118 where this near-field coupling may occur is referred to herein as a coupling-mode region.

Figure 2:
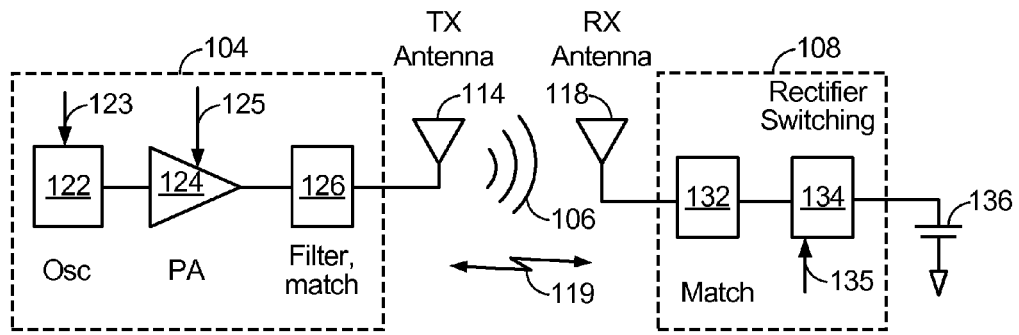
FIG. 2 shows a simplified schematic diagram of a wireless power transfer system.

FIG. 2 shows a simplified schematic diagram of a wireless power transfer system. The transmitter 104 includes an oscillator 122, a power amplifier 124 and a filter and matching circuit 126. The oscillator is configured to generate at a desired frequency, which may be adjusted in response to adjustment signal 123. The oscillator signal may be amplified by the power amplifier 124 with an amplification amount responsive to control signal 125. The filter and matching circuit 126 may be included to filter out harmonics or other unwanted frequencies and match the impedance of the transmitter 104 to the transmit antenna 114.

The receiver 108 may include a matching circuit 132 and a rectifier and switching circuit 134 to generate a DC power output to charge a battery 136 as shown in FIG. 2 or power a device coupled to the receiver (not shown). The matching circuit 132 may be included to match the impedance of the receiver 108 to the receive antenna 118. The receiver 108 and transmitter 104 may communicate on a separate communication channel 119 (e.g., Bluetooth, zigbee, cellular, etc).

Figure 3:
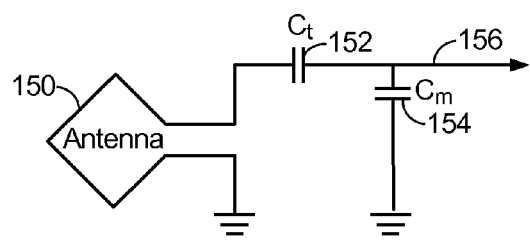
FIG. 3 shows a schematic diagram of a loop antenna for use in exemplary embodiments of the present invention.

As illustrated in FIG. 3, antennas used in exemplary embodiments may be configured as a "loop" antenna 150, which may also be referred to herein as a "magnetic" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive antenna 118 (FIG. 2) within a plane of the transmit antenna 114 (FIG. 2) where the coupled-mode region of the transmit antenna 114 (FIG. 2) may be more powerful.

As stated, efficient transfer of energy between the transmitter 104 and receiver 108 occurs during matched or nearly matched resonance between the transmitter 104 and the receiver 108. However, even when resonance between the transmitter 104 and receiver 108 are not matched, energy may be transferred at a lower efficiency. Transfer of energy occurs by coupling energy from the near-field of the transmitting antenna to the receiving antenna residing in the neighborhood where this near-field is established rather than propagating the energy from the transmitting antenna into free space.

The resonant frequency of the loop or magnetic antennas is based on the inductance and capacitance. Inductance in a loop antenna is generally simply the inductance created by the loop, whereas, capacitance is generally added to the loop antenna's inductance to create a resonant structure at a desired resonant frequency. As a non-limiting example, capacitor 152 and capacitor 154 may be added to the antenna to create a resonant circuit that generates resonant signal 156. Accordingly, for larger diameter loop antennas, the size of capacitance needed to induce resonance decreases as the diameter or inductance of the loop increases. Furthermore, as the diameter of the loop or magnetic antenna increases, the efficient energy transfer area of the near-field increases. Of course, other resonant circuits are possible. As another non-limiting example, a capacitor may be placed in parallel between the two terminals of the loop antenna. In addition, those of ordinary skill in the art will recognize that for transmit antennas the resonant signal 156 may be an input to the loop antenna 150.

Exemplary embodiments of the invention include coupling power between two antennas that are in the near-fields of each other. As stated, the near-field is an area around the antenna in which electromagnetic fields exist but may not propagate or radiate away from the antenna. They are typically confined to a volume that is near the physical volume of the antenna. In the exemplary embodiments of the invention, magnetic type antennas such as single and multi-turn loop antennas are used for both transmit (Tx) and receive (Rx) antenna systems since magnetic near-field amplitudes tend to be higher for magnetic type antennas in comparison to the electric near-fields of an electric-type antenna (e.g., a small dipole). This allows for potentially higher coupling between the pair. Furthermore, "electric" antennas (e.g., dipoles and monopoles) or a combination of magnetic and electric antennas is also contemplated.

The Tx antenna can be operated at a frequency that is low enough and with an antenna size that is large enough to achieve good coupling (e.g., >−4 dB) to a small Rx antenna at significantly larger distances than allowed by far field and inductive approaches mentioned earlier. If the Tx antenna is sized correctly, high coupling levels (e.g., −2 to −4 dB) can be achieved when the Rx antenna on a host device is placed within a coupling-mode region (i.e., in the near-field) of the driven Tx loop antenna.

Figure 4:
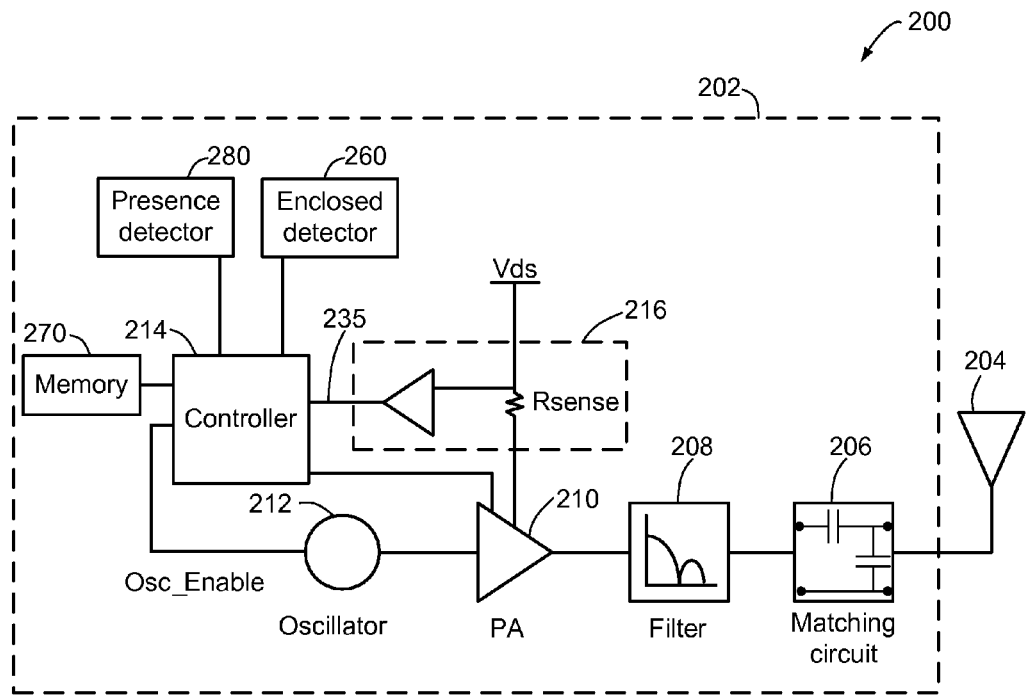
FIG. 4 is a simplified block diagram of a transmitter, in accordance with an exemplary embodiment of the present invention.

FIG. 4 is a simplified block diagram of a transmitter 200, in accordance with an exemplary embodiment of the present invention. The transmitter 200 includes transmit circuitry 202 and a transmit antenna 204. Generally, transmit circuitry 202 provides RF power to the transmit antenna 204 by providing an oscillating signal resulting in generation of near-field energy about the transmit antenna 204. By way of example, transmitter 200 may operate at the 13.56 MHz ISM band.

Exemplary transmit circuitry 202 includes a fixed impedance matching circuit 206 for matching the impedance of the transmit circuitry 202 (e.g., 50 ohms) to the transmit antenna 204 and a low pass filter (LPF) 208 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that can be varied based on measurable transmit metrics, such as output power to the antenna or DC current draw by the power amplifier. Transmit circuitry 202 further includes a power amplifier 210 configured to drive an RF signal as determined by an oscillator 212. The transmit circuitry may be comprised of discrete devices or circuits, or alternately, may be comprised of an integrated assembly. An exemplary RF power output from transmit antenna 204 may be on the order of 2.5 Watts.

Transmit circuitry 202 further includes a controller 214 for enabling the oscillator 212 during transmit phases (or duty cycles) for specific receivers, for adjusting the frequency of the oscillator, and for adjusting the output power level for implementing a communication protocol for interacting with neighboring devices through their attached receivers.

The transmit circuitry 202 may further include a load sensing circuit 216 for detecting the presence or absence of active receivers in the vicinity of the near-field generated by transmit antenna 204. By way of example, a load sensing circuit 216 monitors the current flowing to the power amplifier 210, which is affected by the presence or absence of active receivers in the vicinity of the near-field generated by transmit antenna 204. Detection of changes to the loading on the power amplifier 210 are monitored by controller 214 for use in determining whether to enable the oscillator 212 for transmitting energy to communicate with an active receiver.

Transmit antenna 204 may be implemented as an antenna strip with the thickness, width and metal type selected to keep resistive losses low. In a conventional implementation, the transmit antenna 204 can generally be configured for association with a larger structure such as a table, mat, lamp or other less portable configuration. Accordingly, the transmit antenna 204 generally will not need "turns" in order to be of a practical dimension. An exemplary implementation of a transmit antenna 204 may be "electrically small" (i.e., fraction of the wavelength) and tuned to resonate at lower usable frequencies by using capacitors to define the resonant frequency. In an exemplary application where the transmit antenna 204 may be larger in diameter, or length of side if a square loop, (e.g., 0.50 meters) relative to the receive antenna, the transmit antenna 204 will not necessarily need a large number of turns to obtain a reasonable capacitance.

The transmitter 200 may gather and track information about the whereabouts and status of receiver devices that may be associated with the transmitter 200. Thus, the transmitter circuitry 202 may include a presence detector 280, an enclosed detector 290, or a combination thereof, connected to the controller 214 (also referred to as a processor herein). The controller 214 may adjust an amount of power delivered by the amplifier 210 in response to presence signals from the presence detector 280 and the enclosed detector 290. The transmitter may receive power through a number of power sources, such as, for example, an AC-DC converter (not shown) to convert conventional AC power present in a building, a DC-DC converter (not shown) to convert a conventional DC power source to a voltage suitable for the transmitter 200, or directly from a conventional DC power source (not shown).

As a non-limiting example, the presence detector 280 may be a motion detector utilized to sense the initial presence of a device to be charged that is inserted into the coverage area of the transmitter. After detection, the transmitter may be turned on and the RF power received by the device may be used to toggle a switch on the Rx device in a pre-determined manner, which in turn results in changes to the driving point impedance of the transmitter.

As another non-limiting example, the presence detector 280 may be a detector capable of detecting a human, for example, by infrared detection, motion detection, or other suitable means. In some exemplary embodiments, there may be regulations limiting the amount of power that a transmit antenna may transmit at a specific frequency. In some cases, these regulations are meant to protect humans from electromagnetic radiation. However, there may be environments where transmit antennas are placed in areas not occupied by humans, or occupied infrequently by humans, such as, for example, garages, factory floors, shops, and the like. If these environments are free from humans, it may be permissible to increase the power output of the transmit antennas above the normal power restrictions regulations. In other words, the controller 214 may adjust the power output of the transmit antenna 204 to a regulatory level or lower in response to human presence and adjust the power output of the transmit antenna 204 to a level above the regulatory level when a human is outside a regulatory distance from the electromagnetic field of the transmit antenna 204.

As a non-limiting example, the enclosed detector 290 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 200 does not remain on indefinitely may be used. In this case, the transmitter 200 may be programmed to shut off after a user-determined amount of time. This feature prevents the transmitter 200, notably the power amplifier 210, from running long after the wireless devices in its perimeter are fully charged. This event may be due to the failure of the circuit to detect the signal sent from either the repeater or the receive coil that a device is fully charged. To prevent the transmitter 200 from automatically shutting down if another device is placed in its perimeter, the transmitter 200 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
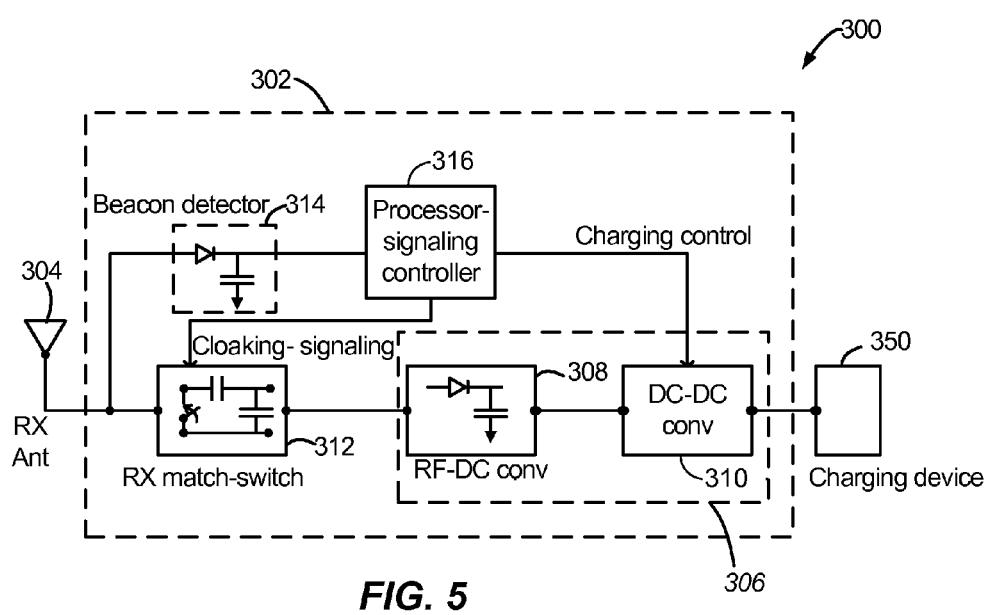
FIG. 5 is a simplified block diagram of a receiver, in accordance with an exemplary embodiment of the present invention.

FIG. 5 is a simplified block diagram of a receiver 300, in accordance with an exemplary embodiment of the present invention. The receiver 300 includes receive circuitry 302 and a receive antenna 304. Receiver 300 further couples to device 350 for providing received power thereto. It should be noted that receiver 300 is illustrated as being external to device 350 but may be integrated into device 350. Generally, energy is propagated wirelessly to receive antenna 304 and then coupled through receive circuitry 302 to device 350.

Receive antenna 304 is tuned to resonate at the same frequency, or near the same frequency, as transmit antenna 204 (FIG. 4). Receive antenna 304 may be similarly dimensioned with transmit antenna 204 or may be differently sized based upon the dimensions of the associated device 350. By way of example, device 350 may be a portable electronic device having diametric or length dimension smaller that the diameter of length of transmit antenna 204. In such an example, receive antenna 304 may be implemented as a multi-turn antenna in order to reduce the capacitance value of a tuning capacitor (not shown) and increase the receive antenna's impedance. By way of example, receive antenna 304 may be placed around the substantial circumference of device 350 in order to maximize the antenna diameter and reduce the number of loop turns (i.e., windings) of the receive antenna and the inter-winding capacitance.

Receive circuitry 302 provides an impedance match to the receive antenna 304. Receive circuitry 302 includes power conversion circuitry 306 for converting a received RF energy source into charging power for use by device 350. Power conversion circuitry 306 includes an RF-to-DC converter 308 and may also in include a DC-to-DC converter 310. RF-to-DC converter 308 rectifies the RF energy signal received at receive antenna 304 into a non-alternating power while DC-to-DC converter 310 converts the rectified RF energy signal into an energy potential (e.g., voltage) that is compatible with device 350. Various RF-to-DC converters are contemplated, including partial and full rectifiers, regulators, bridges, doublers, as well as linear and switching converters.

Receive circuitry 302 may further include switching circuitry 312 for connecting receive antenna 304 to the power conversion circuitry 306 or alternatively for disconnecting the power conversion circuitry 306. Disconnecting receive antenna 304 from power conversion circuitry 306 not only suspends charging of device 350, but also changes the "load" as "seen" by the transmitter 200 (FIG. 2).

As disclosed above, transmitter 200 includes load sensing circuit 216 which detects fluctuations in the bias current provided to transmitter power amplifier 210. Accordingly, transmitter 200 has a mechanism for determining when receivers are present in the transmitter's near-field.

When multiple receivers 300 are present in a transmitter's near-field, it may be desirable to time-multiplex the loading and unloading of one or more receivers to enable other receivers to more efficiently couple to the transmitter. A receiver may also be cloaked in order to eliminate coupling to other nearby receivers or to reduce loading on nearby transmitters. This "unloading" of a receiver is also known herein as a "cloaking" Furthermore, this switching between unloading and loading controlled by receiver 300 and detected by transmitter 200 provides a communication mechanism from receiver 300 to transmitter 200 as is explained more fully below. Additionally, a protocol can be associated with the switching which enables the sending of a message from receiver 300 to transmitter 200. By way of example, a switching speed may be on the order of 100 µsec.

In an exemplary embodiment, communication between the transmitter and the receiver refers to a device sensing and charging control mechanism, rather than conventional two-way communication. In other words, the transmitter uses on/off keying of the transmitted signal to adjust whether energy is available in the near-filed. The receivers interpret these changes in energy as a message from the transmitter. From the receiver side, the receiver uses tuning and de-tuning of the receive antenna to adjust how much power is being accepted from the near-field. The transmitter can detect this difference in power used from the near-field and interpret these changes as a message from the receiver.

Receive circuitry 302 may further include signaling detector and beacon circuitry 314 used to identify received energy fluctuations, which may correspond to informational signaling from the transmitter to the receiver. Furthermore, signaling and beacon circuitry 314 may also be used to detect the transmission of a reduced RF signal energy (i.e., a beacon signal) and to rectify the reduced RF signal energy into a nominal power for awakening either un-powered or power-depleted circuits within receive circuitry 302 in order to configure receive circuitry 302 for wireless charging.

Receive circuitry 302 further includes processor 316 for coordinating the processes of receiver 300 described herein including the control of switching circuitry 312 described herein. Cloaking of receiver 300 may also occur upon the occurrence of other events including detection of an external wired charging source (e.g., wall/USB power) providing charging power to device 350. Processor 316, in addition to controlling the cloaking of the receiver, may also monitor beacon circuitry 314 to determine a beacon state and extract messages sent from the transmitter. Processor 316 may also adjust DC-to-DC converter 310 for improved performance.

Figure 6:
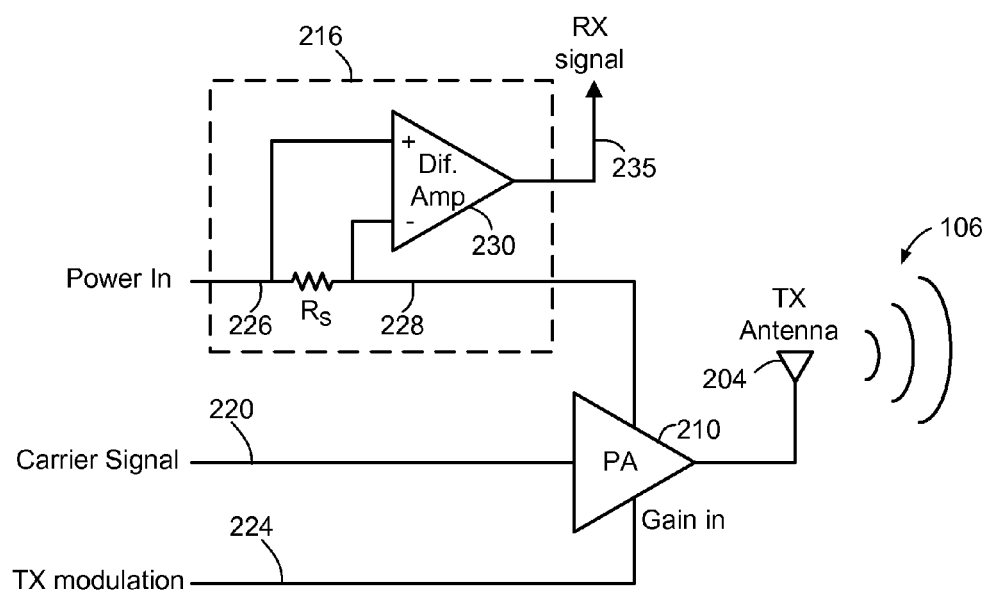
FIG. 6 shows a simplified schematic of a portion of transmit circuitry for carrying out messaging between a transmitter and a receiver.

FIG. 6 shows a simplified schematic of a portion of transmit circuitry for carrying out messaging between a transmitter and a receiver. In some exemplary embodiments of the present invention, a means for communication may be enabled between the transmitter and the receiver. In FIG. 6 a power amplifier 210 drives the transmit antenna 204 to generate the radiated field. The power amplifier is driven by a carrier signal 220 that is oscillating at a desired frequency for the transmit antenna 204. A transmit modulation signal 224 is used to control the output of the power amplifier 210.

The transmit circuitry can send signals to receivers by using an ON/OFF keying process on the power amplifier 210. In other words, when the transmit modulation signal 224 is asserted, the power amplifier 210 will drive the frequency of the carrier signal 220 out on the transmit antenna 204. When the transmit modulation signal 224 is negated, the power amplifier will not drive out any frequency on the transmit antenna 204.

The transmit circuitry of FIG. 6 also includes a load sensing circuit 216 that supplies power to the power amplifier 210 and generates a receive signal 235 output. In the load sensing circuit 216 a voltage drop across resistor $R_s$ develops between the power in signal 226 and the power supply 228 to the power amplifier 210. Any change in the power consumed by the power amplifier 210 will cause a change in the voltage drop that will be amplified by differential amplifier 230. When the transmit antenna is in coupled mode with a receive antenna in a receiver (not shown in FIG. 6) the amount of current drawn by the power amplifier 210 will change. In other words, if no coupled mode resonance exist for the transmit antenna 204, the power required to drive the radiated field will be a first amount. If a coupled mode resonance exists, the amount of power consumed by the power amplifier 210 will go up because much of the power is being coupled into the receive antenna. Thus, the receive signal 235 can indicate the presence of a receive antenna coupled to the transmit antenna 235 and can also detect signals sent from the receive antenna. Additionally, a change in receiver current draw will be observable in the transmitter's power amplifier current draw, and this change can be used to detect signals from the receive antennas.

Details of some exemplary embodiments for cloaking signals, beacon signals, and circuits for generating these signals can be seen in U.S. Utility patent application Ser. No. 12/249,873, entitled "REVERSE LINK SIGNALING VIA RECEIVE ANTENNA IMPEDANCE MODULATION" filed on Oct. 10, 2008; and in U.S. Utility patent application Ser. No. 12/249,861, entitled "TRANSMIT POWER CONTROL FOR A WIRELESS CHARGING SYSTEM" filed on Oct. 10, 2008, both herein incorporated by reference in their entirety.

Details of exemplary communication mechanisms and protocols can be seen in U.S. Utility patent application Ser. No. 12/249,866 entitled "SIGNALING CHARGING IN WIRELESS POWER ENVIRONMENT" filed on Oct. 10, 2008, the contents of which is incorporated by reference herein in its entirety.

FIGS. 7-17 illustrate a host device 400 having transmit circuitry (e.g., transmit circuitry 202 of FIG. 4) and at least one transmit antenna 402 operably coupled thereto and configured to wirelessly transmit power within an associated near-field region. It is noted that transmit circuitry and associated one or more transmit antennas may also be referred to herein as a "charging apparatus," a "charging platform," or a "host device peripheral." Accordingly, the host device peripheral is configured to couple to a host device. Although host device 400 is depicted as a laptop computer in FIGS. 7-17, embodiments of the present invention are not so limited. Rather, host device 400 may comprise any known and suitable electronic device.

Transmit antenna 402 may be coupled to host device 400 in any suitable manner and at any suitable position. For example, as illustrated in FIGS. 7 and 8, transmit antenna 402 may be coupled to a cover 408 (illustrated in each of FIGS. 7 and 8 as being in an "open" position) of host device 400. More specifically, with reference to FIG. 7, transmit antenna 402 may be positioned adjacent a surface 406 of cover 408, wherein surface 406 is opposite a surface having a display screen (not shown). As another example, as illustrated in FIG. 8, transmit antenna 402 may be positioned around and adjacent another surface 410 of cover 408, wherein surface 410 is substantially perpendicular to each of surface 406 and a surface having a display screen (not shown). As yet another example, as illustrated in FIG. 9, transmit antenna 402 may be positioned adjacent a surface 412 of a base 414 of host device 400, wherein surface 412 may be adjacent to a keyboard 416 of host device 400. It is noted that transmit antenna 402 may be coupled to host device 400 in a manner so as to avoid any electrical interference between transmit antenna 402 and any metallic components of host device 400 (e.g., a metallic display of host device 400). It is further noted that although FIGS. 7-9 illustrate host device 400 having a single transmit antenna coupled thereto, embodiments of the present invention are not so limited. Rather, a host device having a plurality of transmit antennas is within the scope of the present invention.

Figure 10:
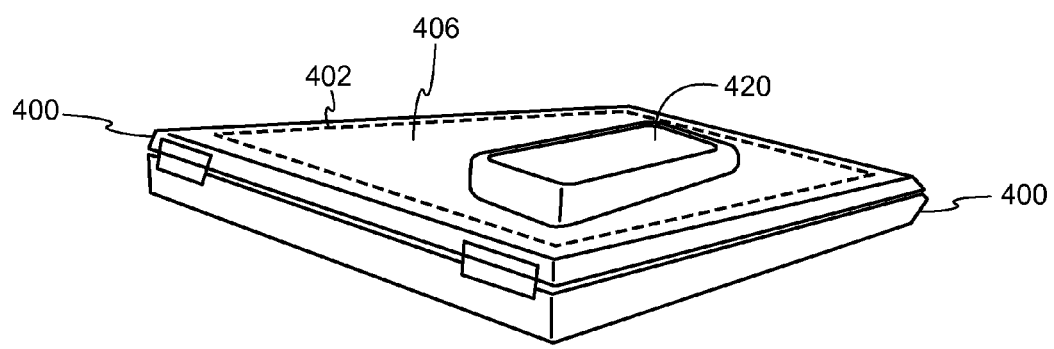
FIG. 10 illustrates a charging device having an electronic device positioned thereon, according to an exemplary embodiment of the present invention.

FIG. 10 illustrates host device 400 having transmit antenna 402 coupled thereto and positioned adjacent surface 406 of cover 408, which is depicted in FIG. 10 as being in a "closed" position. Furthermore, an electronic device 420 may be positioned on surface 406 and within a near-filed region of transmit antenna 402 and, therefore, may receive power wirelessly transmitted by transmit antenna 402. More specifically, power transmitted from transmit antenna 402 may be received by receive antenna (e.g., receive antenna 118 of FIG. 2) and a receiver (e.g., receiver 108 of FIG. 2), which is coupled to electronic device 420. It is noted that the term "electronic device" as used herein may comprise a chargeable device having a chargeable battery or may comprise a device configured to be independently powered by wireless power.

Figure 11:
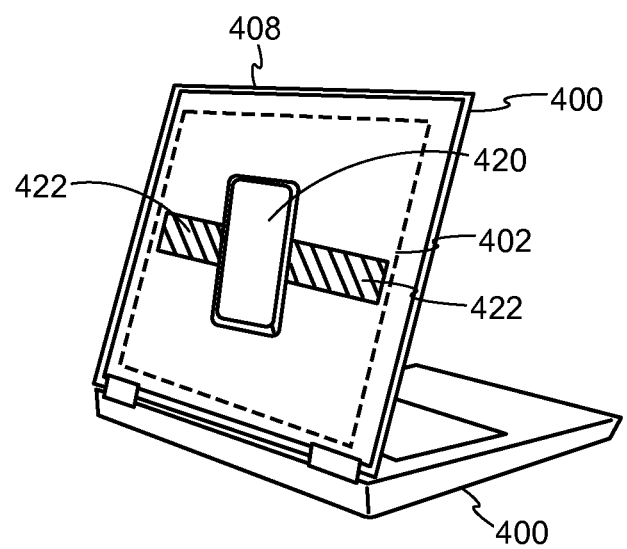
FIG. 11 illustrates a charging device having an electronic device attached thereto, in accordance with an exemplary embodiment of the present invention.
Figure 12:
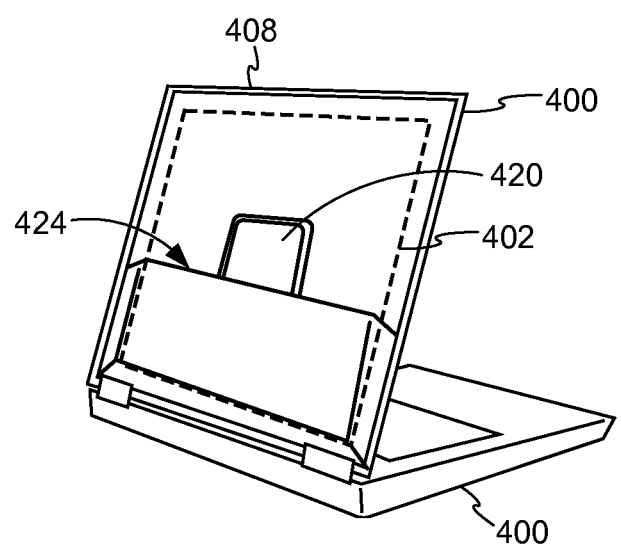
FIG. 12 illustrates a charging device having a pocket and an electronic device positioned therein, in accordance with an exemplary embodiment of the present invention.
Figure 13:
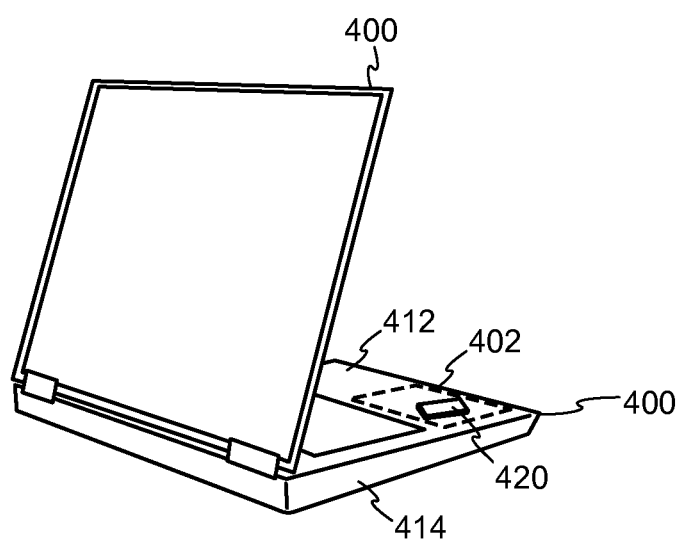
FIG. 13 illustrates another charging device having an electronic device positioned thereon, according to an exemplary embodiment of the present invention.

FIG. 11 illustrates host device 400 including an attachment device 422 configured to enable one or more electronic devices, such as electronic device 420, to be mechanically attached to cover 408 of host device 400 and positioned within a near-field of transmit antenna 402. For example only, attachment device 422 may comprise a strap configured to attach to each of cover 408 and electronic device 420 and, therefore, attach cover 408 and electronic device 420 together. As another example, electronic device 420 may include a clip or a snap (not shown) configured to attach to attachment device 422, which is coupled to cover 408. As yet another example, each of cover 408 and electronic device 420 may include a Velcro® pad to enable cover 408 and electronic device 420 to be attached together. Further, as illustrated in FIG. 12, host device 400 may include a pocket 424 positioned proximate cover 408 and configured to hold one or more electronic devices, such as electronic device 420, proximate cover 408 and within a near-field of transmit antenna 402. Additionally, as illustrated in FIG. 13, one or more electronic devices, such as electronic device 420, may be positioned on surface 412 of base 414 and within a near-field region of transmit antenna 402, which is positioned adjacent surface 412.

Figure 14:
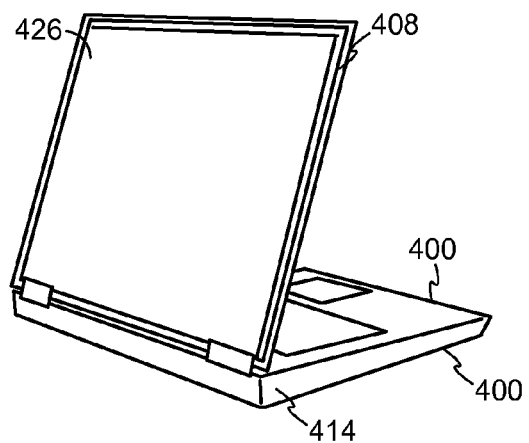
FIGS. 14 and 15 illustrate a charging device comprising a charging pad, according to an exemplary embodiment of the present invention.
Figure 15:
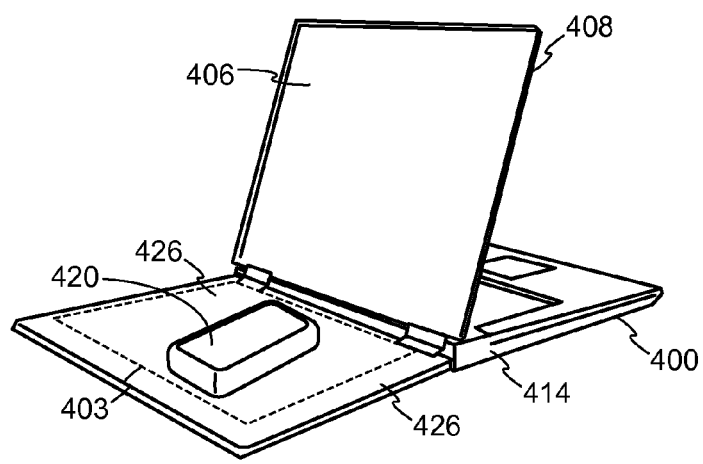

FIGS. 14 and 15 illustrate a charging pad 426 attached to host device 400. Specifically, FIG. 14 illustrates charging pad 426 positioned adjacent surface 406 (see FIG. 7) of cover 408. Further, FIG. 15 illustrates charging pad 426 in a folded down position remote from surface 406. According to one exemplary embodiment, charging pad 426 may be attached to host device 400 in a manner to enable charging pad 426 to pivot about base 414 of host device 400. More specifically, charging pad 426 may be configured to pivot about base 414 in a manner similar to, but independent of, cover 408. According to another exemplary embodiment, charging pad 426 may be configured to slide out from and retract into a portion of host device 400. Furthermore, charging pad 426 may comprise a transmit antenna 403 coupled to and configured to receive power from host device 400. As illustrated in FIG. 15, electronic device 420 may be positioned on an inner surface (i.e., a surface configured to abut surface 406) of charging pad 426 and may receive power wirelessly transmitted from transmit antenna 403. It is noted that electronic device 420 may also be positioned on an outer surface (i.e., a surface opposite a surface configured to abut surface 406) of charging pad 426 and may receive power wirelessly transmitted from transmit antenna 403.

FIGS. 16 and 17 each illustrate a charging system 500 including a charging pad 502 configured to operably couple to and receive power from a power source (e.g., host device 400). More specifically, charging pad 502 may include one or more transmit antennas 503 operably coupled thereto and may be configured for operable coupling to a power source (e.g., host device 400) via an electrical connector 506. As a non-limiting example, electrical connector 506 may comprise a removable power cord configured to couple to an electrical connector (e.g., a USB port or an external power plug) of host device 400. FIG. 16 illustrates charging pad 502 electrically decoupled from host device 400 and FIG. 17 illustrates charging pad 502 electrically coupled to host device 400 via electrical connector 506. Although charging pad 502 is illustrated as a planar charging pad, embodiments of the present invention are not so limited. Rather, charging pads having any shape, including three dimensional objects, are within a scope of the present invention. Further, as illustrated in FIG. 17, one or more electronic devices (e.g., electronic device 420) may be positioned on a surface of charging pad 502 and may receive power wirelessly transmitted from transmit antenna 503.

Figure 18:
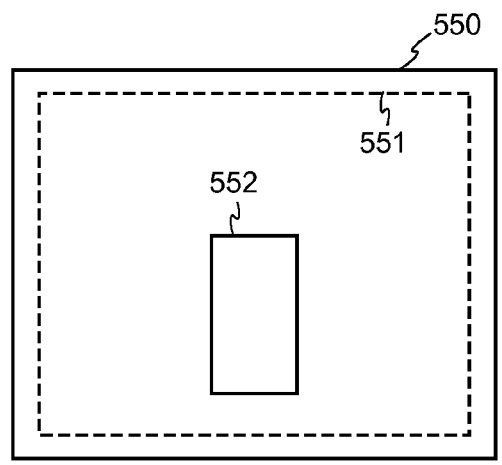
FIG. 18 illustrates a portable wireless power device, according to an exemplary embodiment of the present invention.

FIG. 18 illustrates a portable host device peripheral 550, in accordance with another exemplary embodiment of the present invention. Host device peripheral 550 may include both a wireless power transmitter (e.g., transmitter 200 of FIG. 4) and a wireless power receiver (e.g., receiver 300 of FIG. 5). Accordingly, host device peripheral 550 may include dedicated transmit and receive circuitry and at least one antenna 551 configured to wirelessly transmit power within an associated near-field region. It is noted that transmit and receive circuitry along with associated antennas may be referred to herein as a "wireless power charging apparatus." As a result, host device peripheral 550 may be configured for bidirectional wireless charging, namely, the capability to both receive wireless power and to transmit wireless power. An exemplary approach for such bidirectional wireless charging is described in U.S. patent application Ser. No. 12/552,110, entitled "BIDIRECTIONAL WIRELESS POWER TRANSMISSION" filed on Sep. 1, 2009, the details of which are incorporated by reference herein. Wireless power device 550 may further comprise an energy storage device 552, which may comprise, for example only, a chargeable battery, a storage capacitor, a MEMS energy storage device, or any combination thereof.

Figure 19:
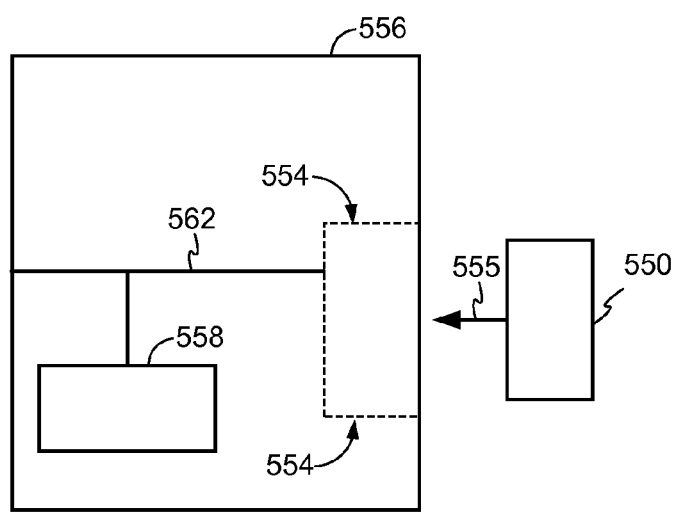
FIG. 19 illustrates a system including an electronic device and a portable wireless power device, according to an exemplary embodiment of the present invention.

In accordance with an exemplary embodiment, host device peripheral 550 is configured to couple to a host device. For example, host device peripheral 550 may be configured for both electrical and mechanical coupling to a host device, such as, for example only, a computer. For example only, with reference to FIG. 19, host device peripheral 550 may be configured for insertion (depicted by arrow 555) within a standard cavity 554 (e.g., a drive bay) of an electronic device 556, which may also be referred to herein as a "host device." As a more specific example, host device peripheral 550 may be configured to be positioned within and attached to a drive bay of a laptop computer. Further, as will be understood by a person having ordinary skill in the art, a drive bay (e.g., cavity 554) may include an electrical port configured to electrically couple a device (e.g., wireless power device 550) positioned therein to an energy storage device 558 via an electrical connector 562. For example only, energy storage device 558 may comprise a chargeable battery, a storage capacitor, a MEMS energy storage device, or any combination thereof. It is noted that, according to one exemplary embodiment, host device peripheral 550 may be integrated within an electronic device. According to another exemplary embodiment, as mentioned above, host device peripheral 550 may configured to be inserted within and detachable from a host device.

FIG. 20 illustrates a wireless system 560 having host device peripheral 550 positioned within cavity 554 of electronic device 556. Further, as illustrated, host device peripheral 550 may be operably coupled to energy storage device 558 via electrical connector 562. Moreover, according to one exemplary embodiment, wireless system 560 may include a power source 565 external to electronic device 556 and configured to convey power to electronic device 556 via electrical connector 566. For example only, power source 565 may comprise a power outlet. In the exemplary embodiment depicted in FIG. 20, host device peripheral 550 may be configured to receive power via electrical connectors 566 and 562. Further, upon receipt of power, wireless power device 550 may be configured to store power within energy storage device 552 (see FIG. 18). According to another exemplary embodiment, as illustrated in FIG. 21, another wireless system 561 may include a transmit antenna 553 configured to wireless transmit power, which may be received by antenna 551 (see FIG. 16) of host device peripheral 550. Upon receipt of power, host device peripheral 550 may be configured to store power within energy storage device 552 (see FIG. 18), convey power to energy storage device 558, or any combination thereof. Additionally, as illustrated in FIG. 22, in an exemplary embodiment wherein host device peripheral 550 is decoupled from an host device (e.g., electronic device 556), host device peripheral 550 may be configured to wirelessly receive power from transmit antenna 553 and store power within energy storage device 552.

As illustrated in FIG. 23, and in accordance with another exemplary embodiment, host device peripheral 550 may include a deployable portion 564. Accordingly, upon positioning host device peripheral 550 within cavity 554 of electronic device 556, portion 564 may be configured to retract out (i.e., deploy in an outward direction) from electronic device 556. Stated another way, portion 564 of host device peripheral 550 may eject from electronic device 556 in similar manner as a portion of CD drive or a portion DVD drive would "eject" from an associated computer. It is noted that portion 564 of host device peripheral 550 may include antenna 551 (see FIG. 18). Accordingly, portion 564 of host device peripheral 550 may be configured to wireless transmit power to another electronic device (e.g., a mobile telephone) positioned within a near-field region of antenna 551. It is noted that portion 564 may include a surface configured for positioning one or more electronic devices thereon. Providing a charging device configured for insertion within a host structure and having a deployable portion configured for wirelessly transmitting power may reduce undesired coupling between a wireless antenna coupled to the portion and the host structure.

Figure 24:
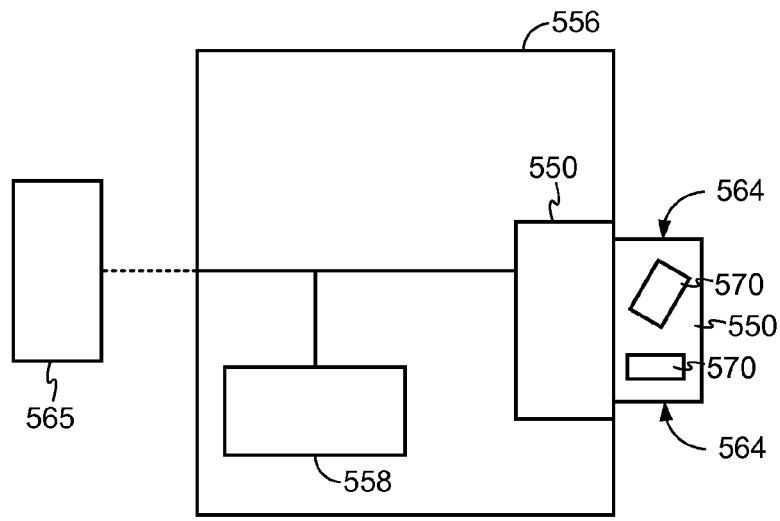
FIG. 24 illustrates a system including a portable wireless power device coupled to an external power source and having a portion deployed from an electronic system with an electronic device positioned thereon, in accordance with an exemplary embodiment of the present invention.
Figure 25:
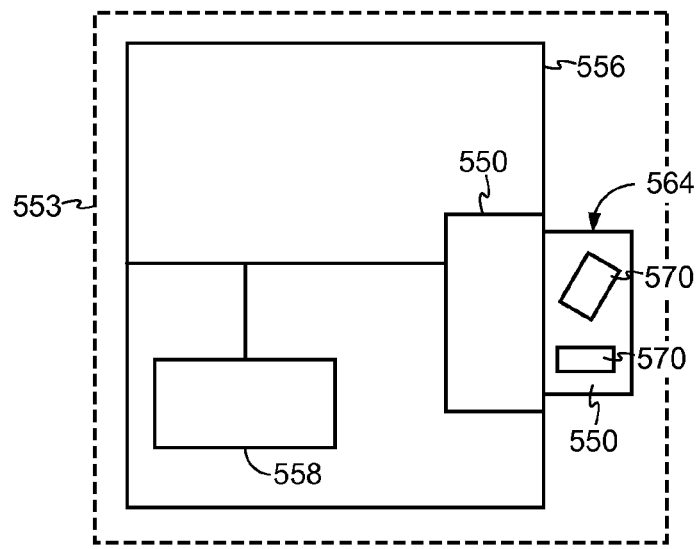
FIG. 25 illustrates a system including a portable wireless power device proximate a transmit antenna and having a portion deployed from an electronic system with an electronic device positioned thereon, according to an exemplary embodiment of the present invention.

In accordance with an exemplary embodiment illustrated in FIG. 24, host device peripheral 550 may be configured to receive power from power source 565, energy storage device 558, energy storage device 552 (see FIG. 18), or any combination thereof, and wireless transmit power to one or more electronic devices 570, which are positioned within an associated near-field region of antenna 551 (see FIG. 18). More specifically, for example only, host device peripheral 550 may be configured to wireless transmit power to one or more electronic devices 570 that are positioned on a surface of portion 564. Further, according to another exemplary embodiment depicted in FIG. 25, host device peripheral 550 may be configured to receive power from transmit antenna 553, energy storage device 558, energy storage device 552 (see FIG. 18), or any combination thereof, and wireless transmit power to one or more electronic devices 570, which are positioned within an associated near-field region of antenna 551 (see FIG. 18). Further, in the exemplary embodiment depicted in FIG. 25, wireless power device may be configured to convey power received from transmit antenna 553 to energy storage device 558, energy storage device 552 (see FIG. 18), or any combination thereof.

Figure 26:
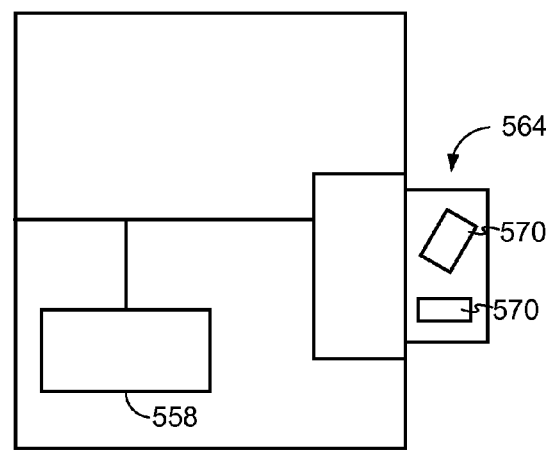
FIG. 26 illustrates a system including a portable wireless power device positioned within an electronic device having a portion deployed from the electronic system with an electronic device positioned thereon, in accordance with an exemplary embodiment of the present invention.
Figure 27:
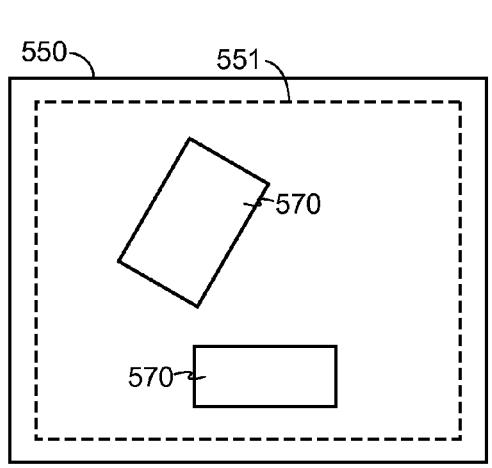
FIG. 27 illustrates a portable wireless power device having an electronic device positioned thereon, according to an exemplary embodiment of the present invention.
Figure 28:
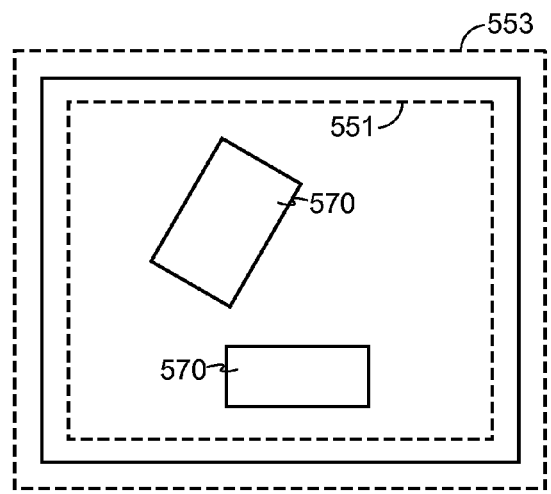
FIG. 28 illustrates a wireless transmit antenna proximate a portable wireless power device having an electronic device positioned thereon, in accordance with an exemplary embodiment of the present invention.

Moreover, in an exemplary embodiment illustrated in FIG. 26, host device peripheral 550 may be configured to wirelessly transmit power stored in energy storage device 552 (see FIG. 18) to one or more electronic devices 570, provide power to energy storage device 558, or any combination thereof. Furthermore, as illustrated in FIG. 27, host device peripheral 550, which is depicted as being decoupled from an electronic device (i.e., electronic device 556), may wireless transmit power stored in energy storage device 552 (see FIG. 18) to one or more electronic devices 570 positioned within a near-field region of antenna 551. Additionally, with reference to FIG. 28, host device peripheral 550, which is depicted as being decoupled from an electronic device (i.e., electronic device 556), may be configured to receive power from transmit antenna 553, energy storage device 552 (see FIG. 18), or any combination thereof, and wireless transmit power to one or more electronic devices 570, which are positioned within an associated near-field region of antenna 551. Furthermore, in the exemplary embodiment depicted in FIG. 28, power wirelessly transmitted from transmit antenna 553 may be stored within energy storage device 552.

Figure 29:
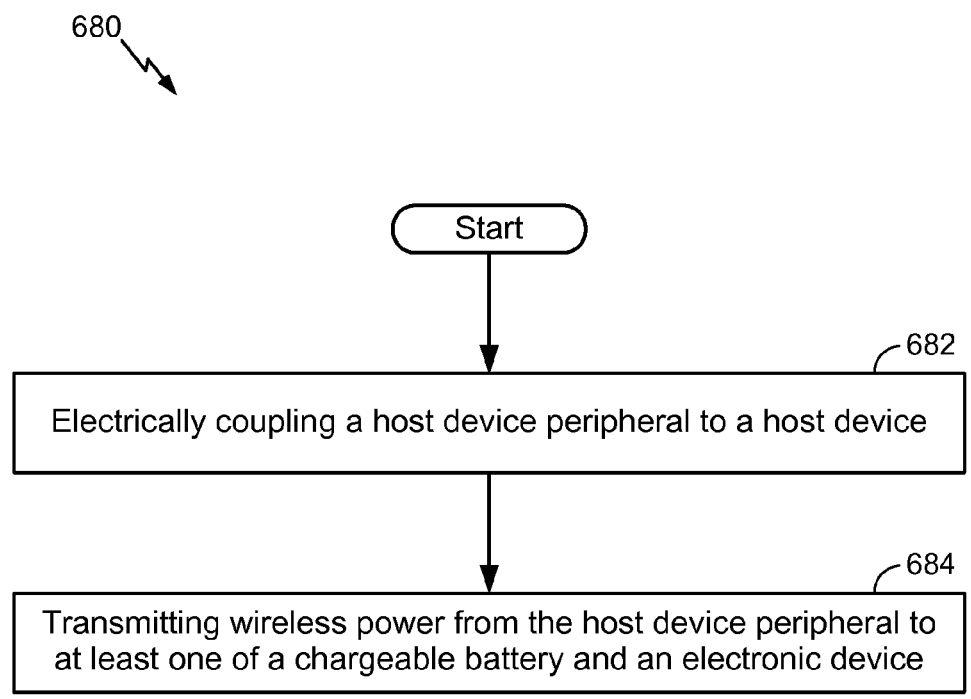
FIG. 29 is a flowchart illustrating a method, in accordance with an exemplary embodiment of the present invention.

FIG. 29 is a flowchart illustrating a method 680, in accordance with one or more exemplary embodiments. Method 680 may include electrically coupling a host device peripheral to a host device (depicted by numeral 682). Method 680 may further include transmitting power from the host device peripheral to at least one chargeable battery (depicted by numeral 684).

As will be understood by one of ordinary skill in the art, electronic devices, such as a charging device, may be configured to operate in various modes such as, for example only, an "active" mode, a "standby" mode, a "sleep" mode, or a "charging" mode. Moreover, as will also be understood by one of ordinary skill in the art, while operating in a power saving mode (e.g., a "standby" mode or a "sleep" mode), a conventional charging device may not be configured to detect the presence of an electronic device positioned proximate or coupled thereto.

In accordance with an exemplary embodiment of the present invention, a charging device may be configured detect an electronic device and transition from a power saving mode to a charging mode upon detection of the electronic device. More specifically, a charging apparatus or device (e.g., electronic device 400 illustrated in FIGS. 7-17) may be configured to detect the presence of an electronic device (e.g., electronic device 420 of FIG. 10) while operating in a power saving mode. Yet, even more specifically, while operating in a power saving mode such as, for example only, a "standby" mode, a "sleep" mode, or any combination thereof, the charging device may be configured to detect the presence of an electronic device, either positioned within an associated near-field region or coupled thereto via a wired connection.

For example only, the presence of an electronic device may be detected via near-field communication between a transmit antenna (e.g., transmit antenna 402; see FIG. 7) of the charging device and an antenna (not shown) within the electronic device and configured for receiving wireless power. As another example, the charging device may be configured to detect the presence of a radio-frequency identification (RFID) tag connected to the electronic device. As yet another example, the charging device may be configured to detect the presence of the electronic device upon the electronic device being electrically coupled to the charging device via a wired connector.

FIG. 30 illustrates a state machine diagram 900 for a charging device configured for detecting the presence of an electronic device while operating in a power saving mode. Furthermore, a state machine diagram 902 of a transmitter (e.g., transmitter 202 of FIG. 4) associated with the charging device is also illustrated in FIG. 30. According to one exemplary embodiment as illustrated in FIG. 30, while the charging device operates in a power saving mode 910, the associated transmitter may remain in a normal operating state 912 and, therefore, may be configured to, according to any known and suitable method, detect the presence of an electronic device being positioned within an associated near-field region. Upon detection of an electronic device, the charging device may transition from power saving mode 910 to a charging mode 916.

FIG. 31 illustrates another state machine diagram 920 for a charging device configured for detecting the presence of an electronic device while operating in a power saving mode. Furthermore, a state machine diagram 922 of a transmitter (e.g., transmitter 202 of FIG. 4) associated with the charging device is also illustrated in FIG. 31. According to another exemplary embodiment, while operating in a power saving mode 924, the charging device may be configured to periodically enter into a "detection" state wherein the associated transmitter may temporarily transition from a power saving mode 930 into a normal operating state 932. Accordingly, while in normal operating state 932, the transmitter may, according to any known and suitable method, detect the presence of an electronic device being positioned within an associated near-field region. Upon detection of an electronic device, the charging device may transition from power saving mode 924 to a charging mode 926.

Figure 32:
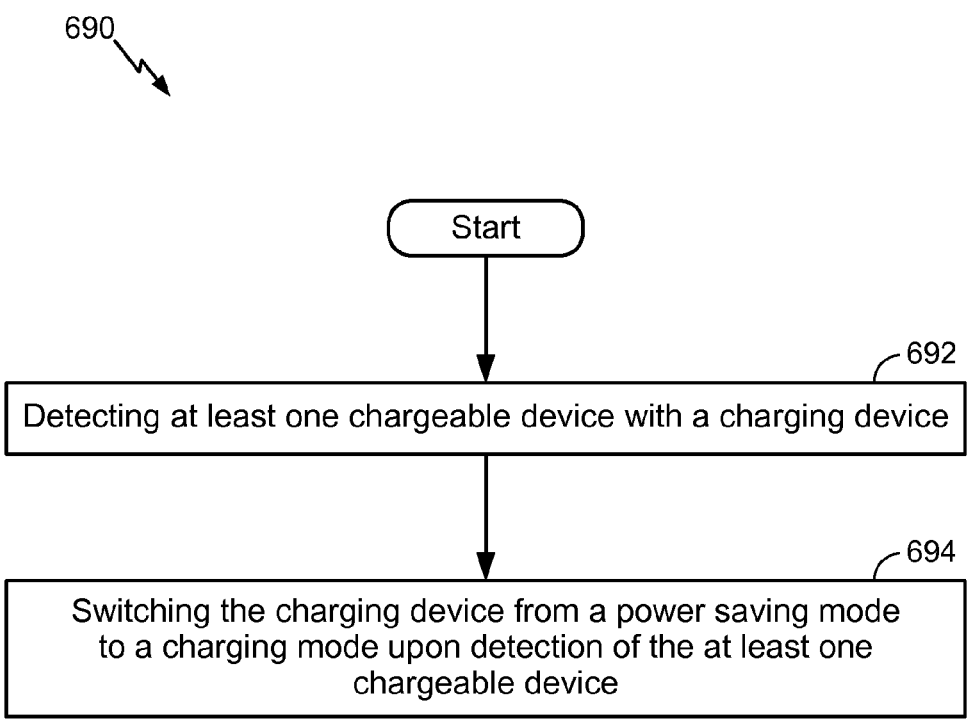
FIG. 32 is a flowchart illustrating another method, in accordance with an exemplary embodiment of the present invention.

FIG. 32 is a flowchart illustrating another method 690, according to one or more exemplary embodiments. Method 690 may include detecting at least one electronic device with a charging device (depicted by numeral 692). Furthermore, method 690 may include switching the charging device from a power saving mode to a charging mode upon detection of the at least one electronic device (depicted by numeral 694).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the exemplary embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the exemplary embodiments of the invention.

The various illustrative logical blocks, modules, and circuits described in connection with the exemplary embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the exemplary embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the exemplary embodiments shown herein but is to be accorded the widest scope consistent with the principles and novel features disclosed herein.

What is claimed is:

1. An apparatus for wireless power charging, comprising:
   a receive circuit configured to wirelessly receive power and charge an energy storage device using the wirelessly received power; and
   a charging device configured to charge an electronic device in a charging mode, the charging device comprising a transmit circuit configured to:
   receive power from the energy storage device and wirelessly transmit the received power to the electronic device, and
   detect a presence or an absence of the electronic device positioned within a wireless field of the transmit circuit while the transmit circuit is operating in a normal operating state,
   wherein the charging device is further configured to transition to the charging mode from a power savings mode to charge the electronic device when the presence of the electronic device is detected by the transmit circuit and remain in the power savings mode if the absence of the electronic device is detected by the transmit circuit.

2. The apparatus of claim 1, wherein the transmit circuit and the receive circuit are configured to be positioned within a cavity of a host device comprising the energy storage device.

3. The apparatus of claim 2, wherein the cavity comprises a drive bay.

4. The apparatus of claim 2, wherein the host device comprises a laptop computer.

5. The apparatus of claim 1, wherein the energy storage device is configured to receive power from an external power source, and wherein the transmit circuit is further configured to receive power from the energy storage device using the external power source.

6. The apparatus of claim 1, wherein the transmit circuit and the receive circuit form a peripheral device.

7. The apparatus of claim 1, wherein the transmit circuit and the receive circuit are integrated into a peripheral device, the peripheral device integrated into a host device comprising the energy storage device.

8. The apparatus of claim 1, wherein the transmit circuit and the receive circuit are integrated into a host device comprising the energy storage device.

9. The apparatus of claim 1, further comprising a portion configured to extend from a host device comprising the energy storage device, the portion comprising a loop antenna coupled to the transmit and receive circuits.

10. The apparatus of claim 1, wherein the transmit circuit and the receive circuit are detachable from a host device comprising the energy storage device.

11. The apparatus of claim 1, further comprising a loop antenna, wherein the loop antenna is coupled to an outside surface of a host device comprising the energy storage device.

12. The apparatus of claim 11, further comprising an attachment device coupled to the outside surface of the host device, the attachment device configured to attach an electronic device to the outside surface of the host device.

13. The apparatus of claim 11, further comprising a receptacle coupled to the outside surface of the host device, the receptacle configured to receive and secure an electronic device.

14. The apparatus of claim 11, wherein the loop antenna is coupled to a portion of a cover of the host device.

15. The apparatus of claim 11, wherein the loop antenna is configured to be placed substantially around a circumference of a portion of the host device, the circumference determined by an outer dimension of the host device.

16. The apparatus of claim 11, wherein the loop antenna is characterized by a shape forming a square.

17. The apparatus of claim 11, wherein the loop antenna is characterized by a shape conforming to a shape determined by an outer dimension of the host device.

18. The apparatus of claim 1, further comprising a charging pad, the charging pad comprising the transmit circuit and the receive circuit.

19. The apparatus of claim 1, wherein the transmit circuit and the receive circuit are configured to mechanically couple to a host device comprising the energy storage device, the transmit circuit and the receiver circuit further configured to pivot about a base of the host device.

20. The apparatus of claim 1, wherein the transmit circuit and the receive circuit are located within a portion of a host device and are configured to deploy therefrom and return into the portion of the host device.

21. The apparatus of claim 1, further comprising a loop antenna, wherein the loop antenna is coupled to a surface of a base of a host device comprising the energy storage device.

22. The apparatus of claim 1, wherein the energy storage device comprises a chargeable battery.

23. The apparatus of claim 1, wherein the transmit circuit and the receive circuit form a peripheral device detachable from a host device comprising the energy storage device.

24. The apparatus of claim 1, wherein the transmit circuit and the receive circuit for a peripheral device configured to mechanically couple to a host device comprising the energy storage device.

25. The apparatus of claim 1, wherein the transmit circuit and the receive circuit form a peripheral device located within a portion of a host device, wherein the peripheral device is configured to deploy therefrom and return into the portion of the host device.

26. A method, comprising:
wirelessly receiving power via a wireless field;
charging an energy storage device with power received wirelessly;
receiving power from the energy storage device;
wirelessly transmitting power to an electronic device via a transmit circuit;
detecting a presence or an absence of the electronic device positioned within a wireless field of the transmit circuit while the transmit circuit is operating in a normal operating state;
transitioning a charging device comprising the transmit circuit to a charging mode from a power saving mode when the presence of the electronic device is detected by the transmit circuit;
remaining in the power savings mode if the absence of the electronic device is detected; and
charging the electronic device when the charging device transitions to the charging mode.

27. The method of claim 26, further comprising mechanically coupling the transmit circuit within a cavity of a host device comprising the energy storage device.

28. The method of claim 27, further comprising deploying a portion comprising a loop antenna to extend from the host device.

29. The method of claim 26, wherein wirelessly transmitting power to an electronic device comprises wirelessly transmitting power to an electronic device positioned on a surface coupled to the transmit circuit.

30. The method of claim 26, wherein detecting comprises detecting the presence or the absence of the electronic device via near-field communication.

31. The method of claim 26, wherein detecting comprises detecting a radio-frequency identification (RFID) tag connected to the electronic device.

32. The method of claim 26, wherein transitioning the charging device from the power savings mode to the charging mode comprises transitioning the charging device from at least one of a standby mode and a sleep mode to the charging mode.

33. The method of claim 26, further comprising mechanically coupling the transmit circuit as a peripheral device within a cavity of a host device comprising the energy storage device.

34. An apparatus for wireless power charging, comprising:
means for wirelessly receiving power;
means for charging an energy storage device using the wirelessly received power;
means for receiving power from the energy storage device;
means for wirelessly transmitting the received power to an electronic device;
means for charging the electronic device comprising the means for wirelessly transmitting; and
means for detecting a presence or an absence of the electronic device positioned within a wireless field of the means for wirelessly transmitting while operating the means for wirelessly transmitting in a normal operating state, wherein the means for charging is configured to:
transition from a power savings mode to a charging mode when the means for detecting detects the presence of the electronic device positioned within the wireless field,
remain in the power savings mode when the means for detecting detects the absence of the electronic device positioned within the wireless field, and
charge the electronic device when in the charging mode.

35. The apparatus of claim 34, further comprising means for mechanically coupling the means for wirelessly transmitting and the means for wirelessly receiving within a cavity of a host device comprising the energy storage device.

36. The apparatus of claim 35, wherein the cavity comprises a drive bay.

37. The apparatus of claim 34, further comprising means for deploying a portion to extend from a host device comprising the energy storage device, the portion comprising a loop antenna coupled to the means for wirelessly transmitting and the means for wirelessly receiving.

38. The apparatus of claim 34, wherein the means for wirelessly transmitting power to an electronic device comprises means for wirelessly transmitting power to an electronic device positioned on a surface coupled to the means for wirelessly transmitting and the means for wirelessly receiving.

39. The apparatus of claim 34, wherein the means for detecting comprises means for detecting the presence or the absence of the electronic device via near-field communication.

40. The apparatus of claim 34, wherein the means for detecting comprises detecting a radio-frequency identification (RFID) tag connected to the electronic device.

41. The apparatus of claim 34, wherein the means for charging being configured to transition from a power savings mode to a charging mode comprises being configured to transition from at least one of a standby mode and a sleep mode to the charging mode.

42. The apparatus of claim 34, further comprising means for receiving power from an external power source.

43. The apparatus of claim 34, wherein the means for wirelessly transmitting and the means for wirelessly receiving are integrated into a host device comprising the energy storage device.

44. The apparatus of claim 34, further comprising means for detaching the means for wirelessly transmitting and the means for wirelessly receiving from a host device comprising the energy storage device.

45. The apparatus of claim 34, further comprising means for coupling a loop antenna to an outside surface of a host device comprising the energy storage device.

46. The apparatus of claim 45, further comprising means for attaching an electronic device to the outside surface of the host device.

47. The apparatus of claim 46, wherein the means for attaching comprises a receptacle coupled to the outside surface of the host device, the receptacle configured for placement of the electronic device.

48. The apparatus of claim 34, further comprising means for coupling a loop antenna to a portion of a cover of a host device comprising the energy storage device.

49. The apparatus of claim 34, wherein the means for wirelessly transmitting and the means for wirelessly receiving are configured to be positioned within a charging pad.

50. The apparatus of claim 34, further comprising means for mechanically coupling the means for wirelessly transmitting and the means for wirelessly receiving to the a device comprising the energy storage device and means for pivoting the means for wirelessly transmitting and the means for wirelessly receiving about a base of the host device.

51. The apparatus of claim 34, further comprising means for deploying the means for wirelessly transmitting and the means for wirelessly receiving out from and returning the means for wirelessly transmitting and the means for wirelessly receiving into a portion of a host device comprising the energy storage device.

52. The apparatus of claim 34, further comprising means for coupling a loop antenna to a surface of a base of a host device comprising the energy storage device.

53. The apparatus of claim 34, further comprising means for positioning a loop antenna substantially around a circumference of a portion of the means for wirelessly transmitting and the means for wirelessly receiving, the circumference determined by an outer dimension of the means for wirelessly transmitting and the means for wirelessly receiving.

54. The apparatus of claim 34, further comprising a loop antenna characterized by a shape forming a square.

55. The apparatus of claim 34, further comprising a loop antenna characterized by a shape conforming to a shape determined by an outer dimension of the means for wirelessly transmitting and the means for wirelessly receiving.

56. The apparatus of claim 34, wherein the energy storage device comprises a chargeable battery.

57. The apparatus of claim 34, wherein the energy storage device is configured to be positioned within a laptop computer.

58. The apparatus of claim 34, further comprising means for mechanically coupling the means for wirelessly transmitting and the means for wirelessly receiving as a peripheral device within a cavity of a host device comprising the energy storage device.

59. The apparatus of claim 34, further comprising means for detaching the means for wirelessly transmitting and the means for wirelessly receiving from a host device comprising the energy storage device, wherein the means for wirelessly transmitted and the means for wirelessly receiving form a peripheral device.

60. The apparatus of claim 34, further comprising means for deploying a peripheral device comprising the means for wirelessly transmitting and the means for wirelessly receiving out from and returning the peripheral device into a portion of a host device comprising the energy storage device.

* * * * *